(12) United States Patent  (10) Patent No.: US 7,470,482 B2
Takamura et al.  (45) Date of Patent: Dec. 30, 2008

(54) RECTANGULAR AIR BATTERY WITH AN INTERIOR BOTTOM RIB TO SUPPORT A SIDEWALL INSULATING GASKET

(75) Inventors: Koshi Takamura, Takatsuki (JP); Harunari Shimamura, Moriguchi (JP); Nobuharu Koshiba, Nara (JP)

(73) Assignee: Panasonic Corporation, Osaka (JP)

( * ) Notice: Subject to any disclaimer, the term of this patent is extended or adjusted under 35 U.S.C. 154(b) by 911 days.

(21) Appl. No.: 11/070,263

(22) Filed: Mar. 3, 2005

(65) Prior Publication Data

US 2005/0196663 A1  Sep. 8, 2005

(30) Foreign Application Priority Data

Mar. 4, 2004  (JP)  ............................. 2004-060041

(51) Int. Cl.
*H01M 2/08*  (2006.01)
(52) U.S. Cl. ......................................... 429/27; 429/172
(58) Field of Classification Search .................. 429/27, 429/172
See application file for complete search history.

(56) References Cited

U.S. PATENT DOCUMENTS 4,557,983 A * 12/1985 Sauer ......................... 429/162
5,576,117 A    11/1996 Morita et al.
6,051,337 A *  4/2000 Heinz, Jr. ..................... 429/174
6,284,400 B1 * 9/2001 Adey et al. ..................... 429/27

FOREIGN PATENT DOCUMENTS

CN         1137177 A    12/1996
WO      WO 00/36693     6/2000

* cited by examiner

*Primary Examiner*—Mark Ruthkosky
(74) *Attorney, Agent, or Firm*—McDermott Will & Emery LLP

(57) ABSTRACT

A rectangular air battery includes: a first case having a bottom with air holes; a second case; and an insulating gasket with a substantially U-shaped cross-section. The first case and the second case are joined such that the opening of the second case faces the bottom of the first case, and are sealed by crimping the opening edge of the sidewalls of the first case onto the outer face of the second case, with the outer sidewalls of the insulating gasket interposed therebetween. A rib is provided on the bottom of the first case so as to protrude inward inside the first case. The rib extends along the four sidewalls of the first case and supports the inner lower end of the inner sidewalls of the insulating gasket, with at least a separator interposed therebetween.

16 Claims, 6 Drawing Sheets

RECTANGULAR AIR BATTERY WITH AN INTERIOR BOTTOM RIB TO SUPPORT A SIDEWALL INSULATING GASKET

BACKGROUND OF THE INVENTION

The present invention relates to a rectangular air battery with an excellent resistance to electrolyte leakage.

Air button batteries are used as the driving power sources for miniature hearing aids, small-sized pagers, etc. Since air batteries need no bulky positive electrode active material, they can accommodate more zinc, which is the negative electrode active material, than other batteries of the same size, for example, silver oxide batteries. Therefore, they have an advantage of having a large battery capacity. On the other hand, air button batteries have a drawback in that the current to be drawn therefrom is small. This drawback makes difficult the use of the batteries as the driving power sources for small-sized electronic equipment, such as portable electronic devices and small-sized audio equipment.

The current to be drawn from air button batteries can be increased by enlarging battery size. However, merely enlarging battery size involves a problem in that enlarged batteries do not fit into the battery mounting space in small-sized electronic devices.

Such problems can be addressed by the following two measures. The first measure is a method of decreasing internal resistance, to increase the current to be drawn. The second one is a method of employing a rectangular shape, instead of the button shape, to make effective use of the battery mounting space in small-sized electronic devices, in order to increase the current to be drawn. International Publication No. WO 00/36693 proposes using a rectangular first case, a rectangular second case, and an insulating gasket, and sealing the first case and the second case with the insulating gasket that is interposed therebetween.

Unlike the button battery, the above-described rectangular air battery has a shape consisting of linear parts and corner parts, thereby presenting the following problems upon sealing.

Since the second case is produced by a drawing process, the corner parts have uneven thickness and undergo work hardening. Thus, the corner parts of the second case have an increased mechanical strength, compared with the linear parts. Because of the difference in mechanical strength between the corner parts and the linear parts, when the battery is sealed by crimping, i.e, by applying a pressure that is suitable for the mechanical strength of the corner parts, the linear parts cannot withstand the sealing pressure, so that the sidewalls of the linear parts buckle and deform inward (See FIG. 11). This causes two additional problems.

The first problem is the creation of gaps between the sidewalls of the linear parts of the second case and the insulating gasket, through which an electrolyte leaks. The second problem is the creation of gaps between the peripheral edge of the air electrode and the inner walls of the first case, which results in poor contact between them and therefore in increased internal resistance of the battery.

The present invention solves these conventional problems and aims to provide a rectangular air battery with an excellent resistance to electrolyte leakage which is capable of preventing a rise in internal resistance.

BRIEF SUMMARY OF THE INVENTION

The present invention provides a rectangular air battery including a rectangular first case, a rectangular second case, an air diffusion paper, a water repellent film, an air electrode, a separator, a negative electrode containing an electrolyte, and an insulating gasket. The first case serves as a positive electrode terminal and includes a bottom with air holes, four sidewalls that are continuous and connected to the bottom, and an upper opening that is defined by the sidewalls. The second case serves as a negative electrode terminal and includes a bottom, four sidewalls that are continuous and connected to the bottom, and an upper opening that is defined by the sidewalls. The air diffusion paper, the water repellent film, the air electrode, and the separator are layered in this order on the bottom inside the first case. The insulating gasket has a substantially U-shaped cross-section and includes four inner sidewalls, four outer sidewalls, and a bottom connecting the inner sidewalls with the outer sidewalls. The insulating gasket is fitted to the second case so as to sandwich the sidewalls of the second case between the inner sidewalls and the outer sidewalls. The negative electrode contains an electrolyte and is accommodated in the second case. The first case and the second case are joined such that the opening of the second case faces the bottom of the first case, and are sealed by crimping the opening edge of the sidewalls of the first case onto the outer face of the second case, with the outer sidewalls of the insulating gasket interposed therebetween. A rib is provided on the bottom of the first case so as to protrude inward inside the first case. This rib extends along the sidewalls of the first case, thereby forming one continuous rectangle. The rib supports the inner lower end of the inner sidewalls of the insulating gasket, with at least the separator interposed therebetween.

In the rectangular air battery in accordance with the present invention, the inner lower end of the inner sidewalls of the insulating gasket is supported by the rib of the first case, with at least the separator interposed therebetween, so that the sidewalls of the second case are prevented from bending inward. This allows the sidewalls of the second case to closely adhere to the insulating gasket, thereby preventing the leakage of the electrolyte. This also obviates the deformation of the air electrode which would be otherwise caused by the deformation of the sidewalls of the second case, and allows the contact between the peripheral edge of the air electrode and the sidewalls of the first case to be maintained. As a result, a rise in internal resistance can also be prevented. Accordingly, the present invention can provide a high quality rectangular air battery with an excellent resistance to electrolyte leakage.

The present invention also provides a rectangular air battery including four ribs that extend in parallel with the sidewalls of the first case with a break at parts corresponding to the corners of the first case, instead of the above-mentioned rib that extends along the sidewalls of the first case and forms one continuous rectangle.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
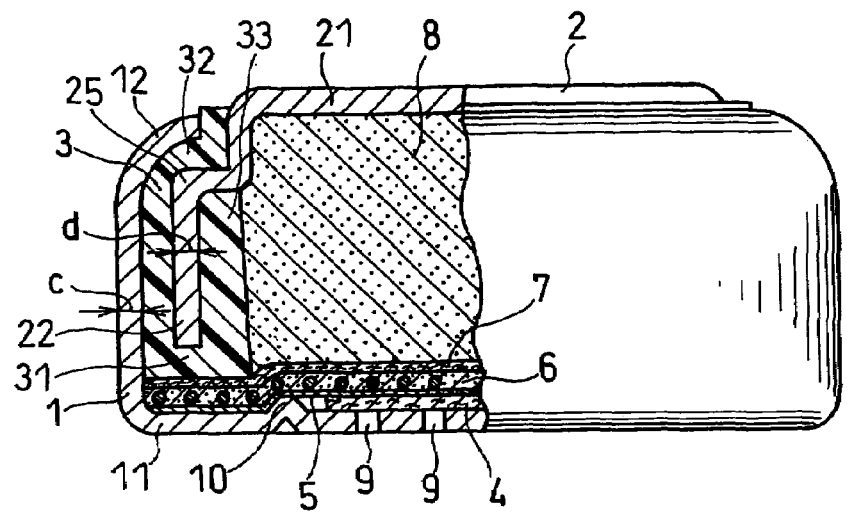
FIG. 1 is a partially sectional front view of a rectangular air battery in one example of the present invention.

A rectangular air battery according to the present invention has air holes in the bottom of a first case. On the bottom of the first case are an air diffusion paper, a water repellent film, an air electrode, and a separator, which are layered in this order. A second case is fitted with an insulating gasket with a substantially U-shaped cross-section. The insulating gasket includes four inner sidewalls, four outer sidewalls, and a bottom connecting the inner sidewalls with the outer sidewalls. The sidewalls of the second case are sandwiched between the inner sidewalls and the outer sidewalls of the insulating gasket. The second case fitted with the insulating gasket accommodates a negative electrode containing an electrolyte. The first case and the second case are joined such that the opening of the second case faces the bottom of the first case, and are sealed by crimping the opening edge of the sidewalls of the first case onto the outer face of the second case, with the outer sidewalls of the insulating gasket interposed therebetween. A rib is provided on the bottom of the first case so as to protrude inward inside the first case. This rib extends along the four sidewalls of the first case, thereby forming one continuous rectangle. The rib supports the inner lower end of the inner sidewalls of the insulating gasket, with at least the separator interposed therebetween.

The air diffusion layer is a layer for diffusing air taken in through the air holes, but it also has a function of absorbing the electrolyte for preventing electrolyte leakage. The water repellent film is a film for preventing the electrolyte from leaking out of the battery. The air electrode is a positive electrode and contains a catalyst for reducing oxygen in air.

In a preferable embodiment of the present invention, the water repellent film, the air electrode, and the separator are sandwiched between the rib of the first case and the bottom of the insulating gasket.

The rib provided on the first case serves as a stopper that prevents the bottom of the insulating gasket from shifting inward inside the battery when the first and second cases are sealed by crimping. Further, the rib can also prevent the sidewalls of the second case from bending inward. Accordingly, the rib allows the sidewalls of the second case to closely adhere to the insulating gasket, thereby suppressing the creation of gaps therebetween. Also, since the deformation of the bottom of the insulating gasket is suppressed, it is possible to suppress the deformation of the water repellent film, the air electrode, and the separator which are sandwiched between the bottom of the insulating gasket and the inner bottom face of the first case.

In another preferable embodiment of the present invention, the sectional shape of the rib of the first case is such that the ratio of the height "b" of the protruded part to the width "a", i.e., the ratio b/a, is 0.1 to 2.5. As used herein, the "protruded part" refers to the part of the rib protruding inward from the bottom of the first case.

In another preferable embodiment of the present invention, the ratio of the thickness "d" of the sidewalls of the second case to the thickness "c" of the sidewalls of the first case, i.e., the ratio d/c, is 1.1 to 2.5. The ratio d/c is more preferably 1.1 to 2.0, because an increase in the thickness of the sidewalls of the second case results in a decrease in the amount of the negative electrode filled in the battery.

In still another preferable embodiment of the present invention, the corner formed by the bottom and each of the outer sidewalls of the insulating gasket is rounded (this corner is hereinafter referred to as "rounded bottom corner" of the insulating gasket), and the peripheral edge of the air electrode is sandwiched between the rounded bottom corner and each of the sidewalls of the first case. The peripheral edge of the metal net or mesh, which serves as the current collector of the air electrode, is electrically connected to the inner faces of the sidewalls of the first case. In this way, intentionally inserting the peripheral edge of the air electrode into the space between the rounded bottom corner and the sidewalls of the first case ensures the electrical contact between the first case and the air electrode. Further, fitting the peripheral edges of the air electrode and the separator to the rounded bottom corner of the insulating gasket also serves to suppress the deformation of the air electrode and the separator upon sealing. This makes it possible to allow the bottom of the insulating gasket to closely adhere to the layered water repellent film, air electrode and separator, and to suppress an increase in internal resistance of the battery.

In still another preferable embodiment of the present invention, the tip of the protruded part of the rib of the first case is rounded.

Therefore, the stress exerted on the point of contact between the tip of the rib and the water repellent film and the air electrode is evenly distributed over the rounded part of the rib, thereby preventing the application of an excessive pressure on the point of contact between the rib and the water repellent film and the air electrode, and hence, the breaking of the water repellent film or the air electrode.

In still another preferable embodiment of the present invention, the bottom of the first case comprises a first part inside the rib and a second part outside the rib. The first part protrudes downward from the second part so that there is a difference in level between the first part and the second part, and the difference in level is equal to or smaller than the thickness of the bottom of the first case. This structure enables an increase in the thickness of the air diffusion paper corresponding to the difference in level. As a result, the air supplied from the air holes can be diffused almost evenly over the whole surface of the air electrode, thereby making it possible to improve heavy-load discharge characteristics.

In still another preferable embodiment of the present invention, the sidewalls of the first case and the second case and the inner and outer sidewalls of the insulating gasket, corresponding to four sides of the rectangular air battery, are slightly rounded outward. Accordingly, the stress that is exerted by the sealing pressure in the axial direction of the cases on the plane direction of the gasket, i.e., the stress in the direction perpendicular to the sealing pressure, can be distributed almost uniformly around the perimeter of the gasket.

In a further preferable embodiment of the present invention, four ribs are provided on the bottom of the first case so as to protrude inward inside the first case. The four ribs extend in parallel with the four sidewalls of the first case with a break at parts corresponding to the corners of the first case. This enables uniform distribution of the stress exerted on the plane direction of the gasket around the perimeter of the gasket, in the same manner as described above. Accordingly, the resistance to electrolyte leakage can be improved.

As the base material of the first case and the second case, stainless steel and iron can be used.

The second case is made of, for example, a cladding material in which a base material is clad with copper metal, and the surface of the base material is plated with nickel metal. The second case is formed such that the inner face of the case is the copper metal and the outer face of the case is the nickel metal plating. Further, the copper metal plated with tin metal may be used.

The insulating gasket can be made of a thermoplastic polymer that is resistant to alkalis. For example, it may be made of a polyolefin resin, such as polyethylene resin or polypropylene resin, or polyamide resin, such as nylon.

The electrolyte that is usually used is a gel electrolyte comprising a mixture of an aqueous solution containing potassium hydroxide (hereinafter referred to as KOH) and zinc oxide (hereinafter referred to as ZnO), and a gelling agent.

The KOH concentration is preferably in the range of 28 to 45% by weight. With respect to the ZnO concentration, ZnO may be dissolved in an aqueous KOH solution to saturation in order to prevent the self-discharge of zinc, which is the negative electrode active material. The aqueous KOH solution may contain an organic anti-corrosive agent that is dispersed therein to suppress the generation of hydrogen gas. An example of the organic anti-corrosive agent is fluoroalkyl polyoxyethylene. Examples of the gelling agent include carboxymethyl cellulose, polyvinyl alcohol, polyethylene oxide, polyacrylic acid, sodium polyacrylate, and chitosan gel. These gelling agents with modifications to their polymerization degree, cross-linking degree, and molecular weight; and mixtures of two or more of them may also be used.

The zinc alloy powder serving as the active material of the negative electrode may include at least one of Al, Bi, In, Ca, Pb, and Sn at 50 to 1000 ppm as a metal species with a high hydrogen overvoltage. Among these metal species, two or more of them may be included.

As the negative electrode, electrodes made of other metals, for example, an iron electrode, an aluminum electrode, a calcium electrode, and a magnesium electrode, may be used in combination with an electrolyte suitable for the electrode.

Examples of the separator include, but are not limited to, vinylon non-woven fabric; cellulose homogeneous film; polyethylene or polypropylene microporous film subjected to a hydrophilic treatment; a laminated sheet of vinylon non-woven fabric and cellulose homogeneous film; and a laminated sheet of vinylon non-woven fabric and polyethylene or polypropylene microporous film subjected to a hydrophilic treatment.

Examples of the present invention are more specifically described below.

Figure 2:
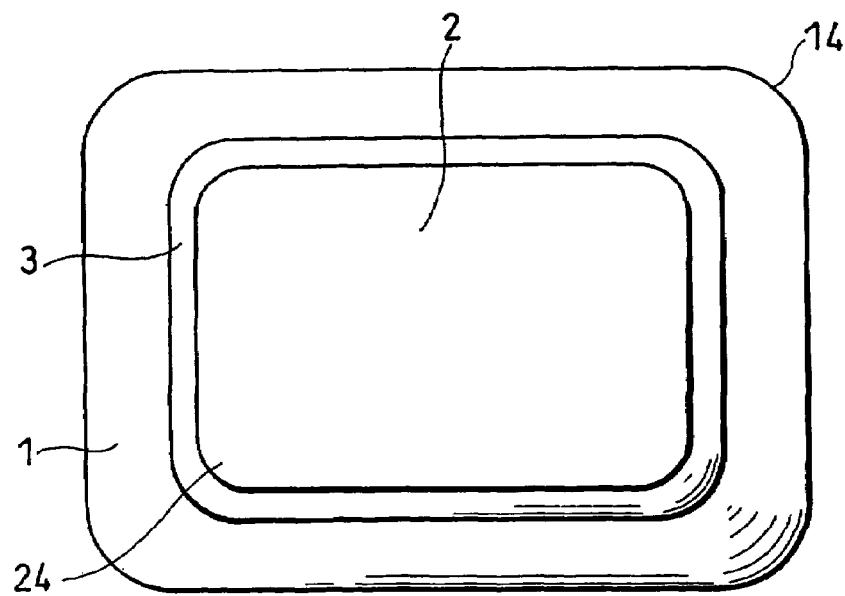
FIG. 2 is a plane view of the battery of FIG. 1.
Figure 3:
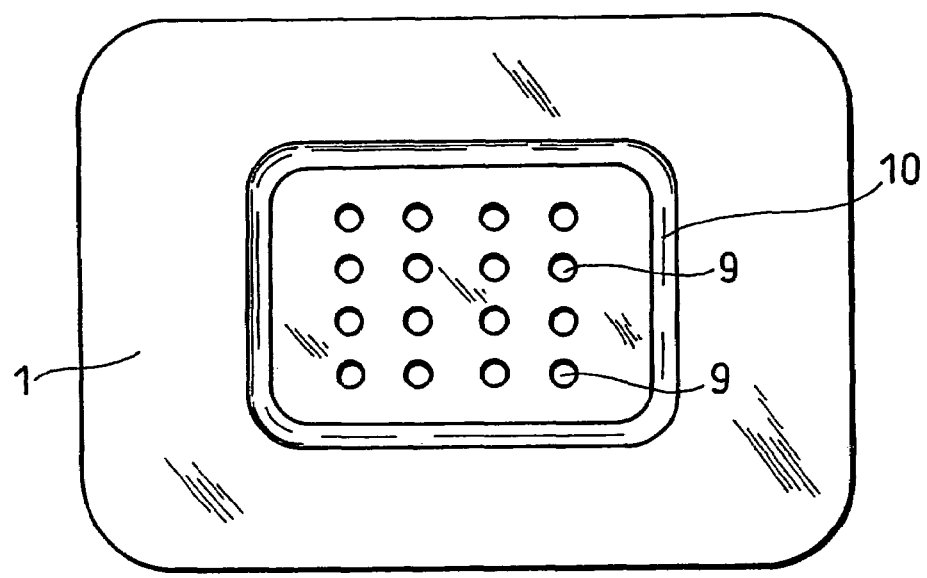
FIG. 3 is a bottom view of the battery of FIG. 1.

FIG. 1 is a partially sectional front view of a rectangular air battery in one example of the present invention. FIG. 2 is a plan view thereof. FIG. 3 is a bottom view thereof.

A rectangular air battery includes a first case 1 and a second case 2 which are sealed with an insulating gasket 3 made of polypropylene resin. The first case comprises a bottom 11; four sidewalls 12 that are continuous and connected to the bottom 11; and an opening that is defined by the sidewalls. The sidewalls 12 of the first case 1 are connected by corner parts 14, which are rounded. Likewise, the second case 2 comprises a bottom 21; four sidewalls 22 that are continuous and connected to the bottom; and an opening that is defined by the sidewalls. Each sidewall of the second case 2 has a shoulder part 25. The sidewalls 22 of the second case 2 are connected by corner parts 24, which are rounded. The gasket 3 comprises: four outer sidewalls 32 that are continuous; four inner sidewalls 33 that are continuous; and a bottom 31 connecting the lower ends of the sidewalls 32 and 33.

This battery is, for example, 25 mm in length, 35 mm in width, and 3.0 mm in thickness. The battery is sealed by crimping, using a sealing die of a press. That is, as described below, the first case 1, which accommodates an air diffusion paper 4, a water repellent film 5, an air electrode 6, and a separator 7, is combined with the second case 2, which is fitted with the gasket 3 at the sidewalls 22 and accommodates a negative electrode 8 containing an electrolyte, such that the opening of the second case faces the bottom of the first case. This combination is set in a sealing die, and the edges of the sidewalls of the first case 1 are crimped onto the sidewalls 22 of the second case 2, with the outer sidewalls 32 of the gasket 3 interposed therebetween. As a result, the sidewalls 32 of the gasket 3 are compressed in the radial direction between the edges of the sidewalls 12 of the first case 1 and the sidewalls 22 of the second case 2, and are further compressed between the inner faces of the sidewalls 12 of the first case 1 and the shoulder parts 25 of the second case 2, thereby forming a liquid-tight seal between the sidewalls 12 of the first case 1 and the sidewalls 22 of the second case 2. The axial compressive force by the opening edge of the sidewalls 12 of the first case 1 causes the edges of the sidewalls 22 of the second case 2 to press the bottom 31 of the gasket 33 against the bottom of the case 1, thereby forming a liquid-tight seal between the bottom of the case 1 and the gasket 3. The axial compressive force by the opening of the sidewalls 12 of the first case 1 presses the sidewalls 22 of the second case 2 inward, thereby pushing the gasket 3 toward the central part of the case 1. However, the bottom of the case 1 has a rib 10, and this rib supports the inner lower ends of the sidewalls 33 of the gasket 3, with a separator 7 and the like interposed therebetween. Accordingly, the sidewalls 22 of the case 2 are prevented from deforming inward, and the gasket 3 is prevented from shifting inward.

Inside the battery, the air diffusion paper 4 bonded to the first case 1, the water repellent film 5 made of a microporous polytetrafluoroethylene film (hereinafter referred to as a PTFE film), the air electrode 6, and the separator 7 made of a polyethylene microporous film subjected to a hydrophilic treatment (hereinafter referred to as a hydrophilic PE microporous film) are layered in this order on the bottom of the first case, as illustrated in FIG. 1. The peripheral edge of the air electrode 6 is electrically connected to the sidewalls of the first case 1. The second case 2 is fitted with the gasket 3 with a U-shaped cross-section. A negative electrode 8 containing an electrolyte is filled into the second case.

The first case 1 is made of a stainless steel base material, and the outer face of the first case 1 is plated with nickel metal. The bottom of the case has a rib 10 and air holes 9 through which air is taken in. The PTFE film 5, the air electrode 6, and the hydrophilic PE microporous film 7 are sandwiched between the bottom of the first case 1 and the gasket 3.

The rib 10 of the first case 1 is provided so as to protrude inward from the bottom of the first case, extending all round at the same distance from the sidewalls of the first case 1. The gasket 3 is disposed between the rib 10 and the sidewalls of the first case 1.

The second case 2 is made of a cladding material in which a stainless steel base material is clad with copper metal, and the surface of the stainless steel is plated with nickel metal.

The second case is formed such that the inner face of the case is the copper metal and the outer face of the case is the nickel metal plating.

An auxiliary sealing layer is interposed between the sidewalls of the first case 1 and the gasket 3, in order to prevent electrolyte leakage. The auxiliary sealing layer is formed by applying a sealant, composed of blown asphalt pitch dissolved in a solvent of toluene, onto the gasket 3 and drying it.

The air electrode 6 is prepared as follows.

First, 40% by weight of manganese oxide, 30% by weight of active carbon, 20% by weight of ketjen black (ketjen black EC, a kind of carbon blacks, available from Mitsubishi Chemical Corporation) serving as a conductive agent, and 10% by weight of polytetrafluoroethylene powder (hereinafter referred to as PTFE powder) serving as a binder are mixed together. This mixture is applied under pressure onto a nickel-plated stainless steel net, which serves as a current collector, to produce the air electrode 6. The peripheral edge of the metal net serving as the current collector of the air electrode 6 is electrically connected to the inner faces of the sidewalls of the first case 1.

The electrolyte is prepared as follows.

An aqueous solution containing 40% by weight of KOH and 3% by weight of ZnO is prepared. This aqueous solution is mixed with 3% by weight of sodium polyacrylate and 1% by weight of carboxymethyl cellulose as gelling agents, to prepare a gel electrolyte.

The negative electrode 8 containing the electrolyte is prepared as follows.

Zinc alloy powder serving as the negative electrode active material is added to the above-mentioned gel electrolyte in a weight ratio of 2:1, and the resultant mixture is mixed together.

In the following, the rib 10 of the first case 1 will be specifically described.

EXAMPLES 1 TO 6

Figure 4:
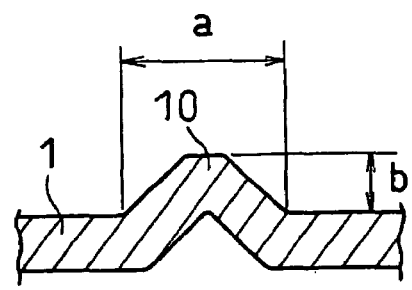
FIG. 4 is an enlarged sectional view of a part of a first case having a rib.

Rectangular air batteries were produced by varying the b/a ratio of the rib 10 of the first case 1 (the ratio of the height "b" of the protruded part of the rib 10 to the width "a"; see FIG. 4) as shown in Table 1. In these examples, the first case 1 and the second case 2 had a thickness of 0.25 mm.

TABLE 1

|  | a | b | b/a |
|---|---|---|---|
| Example 1 | 0.5 | 0.025 | 0.05 |
| Example 2 | 0.5 | 0.05 | 0.1 |
| Example 3 | 0.5 | 0.15 | 0.3 |
| Example 4 | 0.5 | 0.5 | 1.0 |
| Example 5 | 0.5 | 1.25 | 2.5 |
| Example 6 | 0.5 | 1.5 | 3.0 |

EXAMPLES 7 TO 12

The plate thicknesses of the first case 1 and the second case 2 were varied in these examples.

Specifically, rectangular air batteries were produced by varying the plate thicknesses of the first case 1 and the second case 2, i.e., the d/c ratio (the ratio of the sidewall thickness "d" of the second case 2 to the sidewall thickness "c" of the first case 1), as shown in Table 2. In these examples, the b/a ratio of the rib 10 of the first case 1 was fixed to 0.30.

TABLE 2

|  | c | d | d/c |
|---|---|---|---|
| Example 7 | 0.2 | 0.18 | 0.9 |
| Example 8 | 0.2 | 0.22 | 1.1 |
| Example 9 | 0.2 | 0.28 | 1.4 |
| Example 10 | 0.2 | 0.4 | 2.0 |
| Example 11 | 0.2 | 0.5 | 2.5 |
| Example 12 | 0.2 | 0.6 | 3.0 |

EXAMPLE 13

The lower end of the outer sidewalls of the gasket 3 was rounded in this example.

Figure 5:
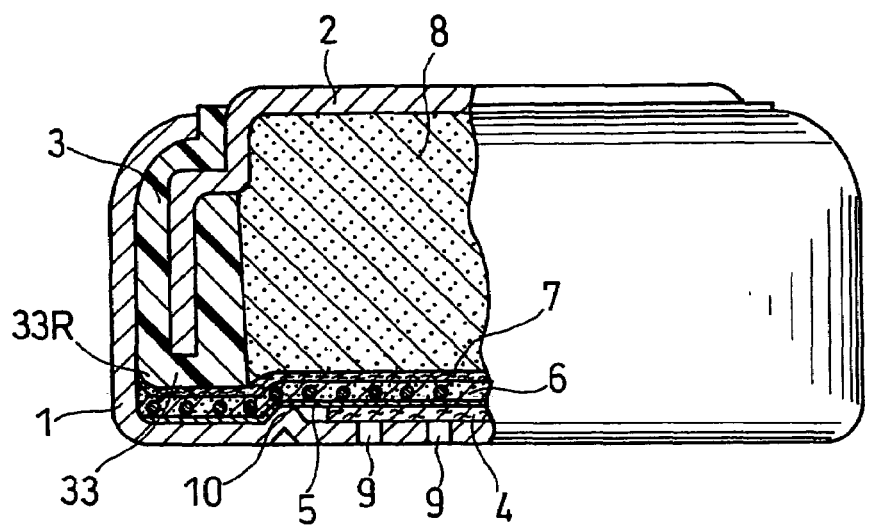
FIG. 5 is a partially sectional front view of a rectangular air battery in another example of the present invention.

Specifically, as illustrated in FIG. 5, the corner formed by the bottom and each of the outer sidewalls of the insulating gasket 3 was rounded such that the radius of curvature of this rounded bottom corner 33R was 0.5 mm. Aside from this, a rectangular air battery with the rib 10 on the first case 1 was produced in the same manner as in Example 8.

EXAMPLE 14

The tip of the protruded part of the rib 10 was rounded in this example.

Figure 6:
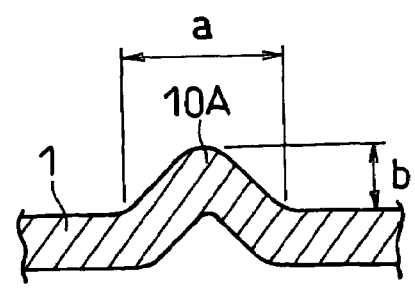
FIG. 6 is an enlarged sectional view showing another example of a part of a first case having a rib.

Specifically, as illustrated in FIG. 6, the tip of the protruded part of the rib 10 was rounded such that the radius of curvature was 0.5 mm. Aside from this, a rectangular air battery was produced in the same manner as in Example 8.

EXAMPLE 15

In this example, the bottom of a first case 101 had a difference in level such that the part of a bottom 111*a* inside a rib 20 was at a lower level than the part of a bottom 111*b* outside the rib 20.

Figure 7:
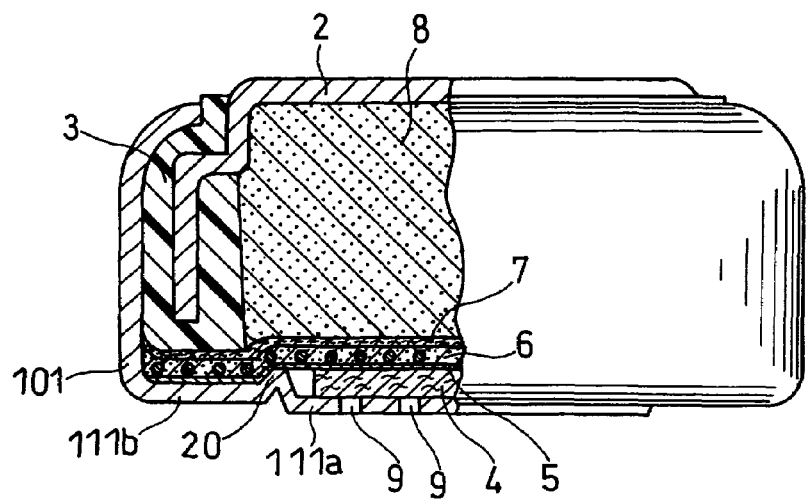
FIG. 7 is a partially sectional front view of a rectangular air battery in still another example of the present invention.

Specifically, as illustrated in FIG. 7, the bottom of the first case 101 had a 0.15 mm difference in level. That is, in the bottom of the case 101, the part 111*a* inside the rib 20 protruded downward from the part 111*b* outside the rib 20 by 0.15 mm. This difference in level was absorbed by increasing the thickness of the air diffusion paper 4. Aside from this, a rectangular air battery was produced in the same manner as in Example 8.

EXAMPLE 16

In this example, the sidewalls of the first case and the second case and the inner and outer sidewalls of the insulating gasket, corresponding to the four sides of the rectangular air battery, were slightly rounded outward.

Figure 8:
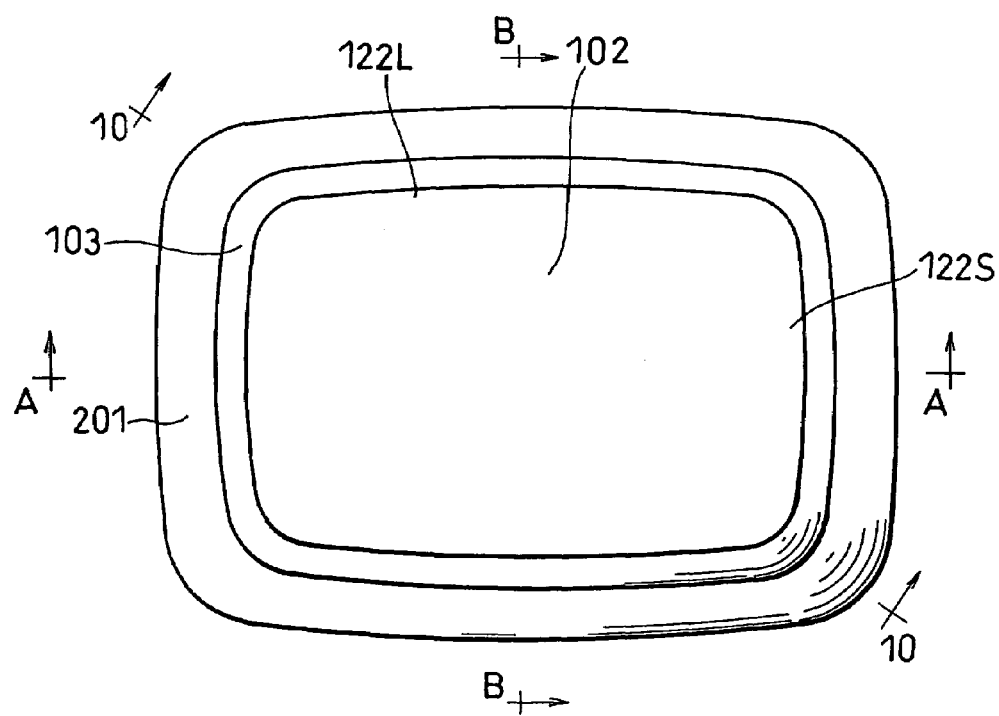
FIG. 8 is a plane view of a rectangular air battery in a further example of the present invention.

Specifically, as illustrated in FIG. 8, the sidewalls of a second case 102, except the corner parts, were rounded outward such that the radius of curvature was 125 mm on shorter sides 122S and 150 mm on longer sides 122L. Likewise, the sidewalls of a first case 201 and the inner and outer sidewalls of an insulating gasket 103, except the corner parts, were rounded such that the radius of curvature was 125 mm on the shorter sides and 150 mm on the longer sides. Aside from these, a rectangular air battery was produced in the same manner as in Example 8.

EXAMPLE 17

In this example, the rib existed only at positions parallel to the linear parts of the bottom of the first case, with a break at each corner.

Figure 9:
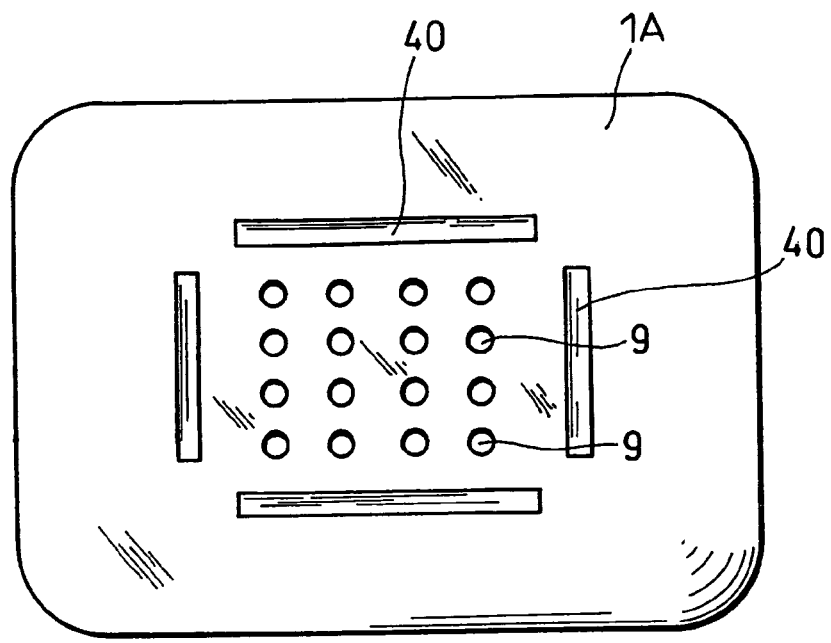
FIG. 9 is a bottom view of a rectangular air battery in a still further example of the present invention.

Specifically, as illustrated in FIG. 9, four ribs 40 were provided only at positions parallel to the linear parts of the bottom of a first case 1A. Therefore, the ribs 40 are not mutually continuous. Aside from this, a rectangular air battery was produced in the same manner as in Example 8.

Comparative Example

A rectangular air battery was produced in the same manner as in Example 4, except that the rib 10 was not provided on the first case 1 and that the rounded bottom corner of the gasket 3 was not provided.

The rectangular air batteries of Examples 1 to 17 and Comparative Example were subjected to high-temperature and high-humidity storage tests, which were leakage acceleration tests, and heat cycle tests (hereinafter referred to as HC tests), which were for checking the internal resistance of these batteries.

High-temperature and high-humidity storage tests were conducted, using 15 cells each of the above-mentioned batteries. The batteries were stored under the conditions of a temperature of 45° C. and a relative humidity of 90% for 3 weeks, and the batteries that were not observed to leak were stored for two more weeks. The batteries that were observed to leak upon the completion of the 3-week storage were not evaluated thereafter for their storage characteristics, i.e., their evaluation was ended after 3 weeks. Only the batteries that were not observed to leak were continuously evaluated thereafter for their storage characteristics. The observation of electrolyte leakage was performed as follows. The batteries after the storage were observed under a magnifying glass for the presence or absence of electrolyte leakage between the first case and the insulating gasket and between the second case and the insulating gasket, and the number of batteries that had leaked was counted. The detection of leakage was made using a reagent that changes color by an alkaline electrolyte (e.g., cresol red reagent). The reagent was sprayed on the battery surface, and whether or not the reagent changed color was observed. When it changed color, it was judged that there was leakage.

HC tests were conducted, using 5 cells each. The batteries were stored in a constant temperature container of 60° C. for 2 hours and then in a constant temperature container of −10° C. for 2 hours. This heat cycle of a total of 4 hours was repeated for 7 days. In order to check the electrical connection between the peripheral edge of the air electrode and the sidewalls of the first case, the internal resistance was measured before and after the test at 1 kHz by the alternating current process. The difference in internal resistance before and after the test was used as the amount of change, and the average of 5 cells was calculated.

Table 3 shows the results.

TABLE 3

|  | Number of leaked batteries after 3-week storage at high temperature and high humidity/cells | Number of leaked batteries after 5-week storage at high temperature and high humidity/cells | Amount of change in internal resistance before and after HC test/Ω |
| --- | --- | --- | --- |
| Example 1 | 2/15 | 3/13 | 10.0 |
| Example 2 | 0/15 | 1/15 | 1.7 |
| Example 3 | 0/15 | 1/15 | 0.6 |
| Example 4 | 0/15 | 1/15 | 0.9 |
| Example 5 | 0/15 | 1/15 | 1.0 |
| Example 6 | 0/15 | 4/12 | 8.0 |
| Example 7 | 0/15 | 2/15 | 2.5 |
| Example 8 | 0/15 | 0/15 | 0.2 |
| Example 9 | 0/15 | 0/15 | 0.2 |
| Example 10 | 0/15 | 1/15 | 0.1 |
| Example 11 | 0/15 | 0/15 | 0.2 |
| Example 12 | 0/15 | 1/15 | 0.2 |
| Example 13 | 0/15 | 0/15 | 0.1 |
| Example 14 | 0/15 | 0/15 | 0.2 |
| Example 15 | 0/15 | 1/15 | 0.3 |
| Example 16 | 0/15 | 0/15 | 0.1 |
| Example 17 | 0/15 | 0/15 | 0.1 |
| Comparative Example | 13/15 | 2/2 | 99.0 |

The results of Table 3 show that the batteries of Examples 1 to 17 have better electrolyte leakage resistance, with fewer batteries that were observed to leak, than the batteries of Comparative Example. Also, the observations of the longitudinal sections of these batteries were as follows. In the batteries of Comparative Example, which had no rib on the first case, the bottom of the insulating gasket was slipped inward inside the battery, and the sidewalls of the second case were bent inward inside the battery, being buckled and deformed. There were gaps between the sidewalls of the first case and the insulating gasket and between the sidewalls of the second case and the insulating gasket. It was considered that leakage occurred through these gaps. Also, when further observation was made, the air electrode and the separator were deformed, and the electrolyte was spread to the peripheral edges of the air electrode and the separator and between the air electrode and the first case. Although no leakage from the air holes was found by visual inspection of the batteries, the electrolyte would have leaked from the air holes if the evaluation period had been extended.

With the batteries of Examples 1 to 6 after the 3-week storage, the number of leaked batteries was very small, compared with the batteries of Comparative Example. This indicates that the provision of the rib on the first case improves the resistance to electrolyte leakage. The observations of longitudinal sections of these batteries were as follows. In the batteries of Examples 1 and 6 and the batteries of Comparative Example, there were gaps between the sidewalls of the first case and the outer sidewalls of the insulating gasket. The batteries of Comparative Example exhibited the largest degree of inward slipping of the insulating gasket bottom and the largest degree of inward bending of the second case sidewall. Contrary to this, regarding the batteries of Examples of the present invention, both the degree of inward slipping of the insulating gasket bottom and the degree of inward bending of the second case sidewall were small, compared with those of the batteries of Comparative Example.

The amount of change in internal resistance before and after the HC tests was largest for the batteries of Comparative Example, followed by the batteries of Examples 1 and 6 and then the batteries of Examples 2 to 5. The batteries after the HC tests were examined for their discharge performance. As a result, the discharge capacity of the batteries of Comparative Example dropped by 90% of the initial capacity, whereas the discharge capacities of the batteries of Examples 2 to 5 lowered by 10% or less of the initial capacity. The discharge capacities of the batteries of Examples 1 and 6 decreased by 50% of the initial capacity. This shows that the ratio b/a of the height "b" of the rib of the first case to the width "a" is preferably 0.1 to 2.5.

With the batteries of Examples 7 to 13 after the 3-week storage, the number of leaked batteries was very small, compared with the batteries of Comparative Example. When the longitudinal sections of the batteries of Examples 7 to 13 were observed, neither the inward slipping of the insulating gasket bottom nor the inward bending of the second case sidewalls was observed.

The amount of change in internal resistance after the HC test was slightly larger for the batteries of Example 7 than for the batteries of Examples 8 to 12. The batteries after the HC test were examined for their discharging performance. The discharge capacity of the batteries of Examples 8 to 12 decreased by 10% or less of the initial capacity, while the discharge capacity of the batteries of Example 7 was observed to lower by 20% of the initial capacity. This indicates that the ratio d/c of the sidewall thickness "d" of the second case to the sidewall thickness "c" of the first case is preferably 1.1 to 2.5. Also, an increase in the thickness "d" of the second case results in a decrease in the amount of the negative electrode to be filled into the battery, thereby causing a decrease in battery capacity. This shows that the ratio d/c is desirably 2.0 or less. Therefore, the ratio d/c is more preferably in the range of 1.1 to 2.0.

The batteries of Example 13 were not observed to leak even after 5 weeks. When the longitudinal sections of the batteries were observed, the air electrode and the separator were not deformed, because the peripheral edges of the air electrode and the separator were inserted into the space between the rounded bottom corner of the insulating gasket and the sidewalls of the first case. The amount of change in internal resistance after the HC test was 0.1 Ù. This indicates that the provision of the rounded bottom corner of the insulating gasket makes it possible not only to improve the resistance to electrolyte leakage, but also to maintain the electrical contact between the peripheral edge of the air electrode and the sidewalls of the first case.

The batteries of Example 14 were not observed to leak even after 5 weeks, and the amount of change in internal resistance after the HC test was 0.2 Ù, which is small. This shows that rounding the tip of the rib also makes it possible to maintain the electrical contact between the peripheral edge of the air electrode and the sidewalls of the first case. Further, when the water repellent film and the air electrode of the decomposed batteries of Example 14 were observed, their parts in contact with the tip of the rib were not sharply deformed. Accordingly, the stress exerted on the point of contact between the tip of the rib and the air electrode is evenly distributed over the rounded part of the rib, thereby preventing the application of an excessive pressure on the point of contact between the rib and the air electrode, and hence, the breaking of the air electrode.

The batteries of Example 15 produced similar results to those of the batteries of Example 8 in both the leakage rate after 5 weeks and the amount of change in internal resistance after the HC test. However, when the batteries of Example 15 and Example 8 were examined for their initial discharge performance, the discharge capacity of the Example 15 increased by 2% with respect to that of Example 8. This increase in discharge capacity of initial discharge performance is due to the improvement in air diffusion efficiency, which resulted in a decrease in diffusion-resistant factor during discharge. This shows that when the bottom of the first case has a difference in level and the thickness of the air diffusion paper is increased, the heavy-load discharge characteristics can be improved.

Figure 10:
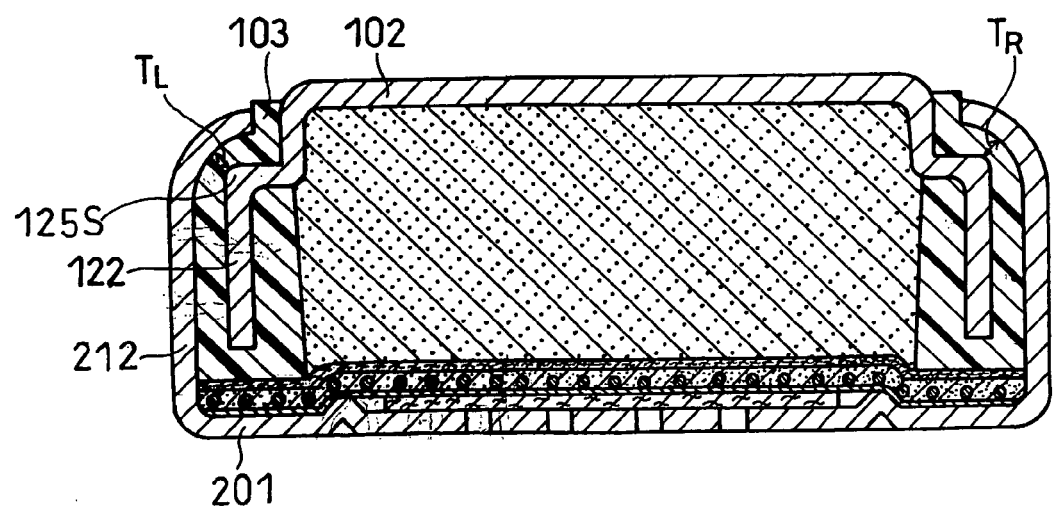
FIG. 10 is a sectional view taken along line 10-10 of FIG. 8.
Figure 11:
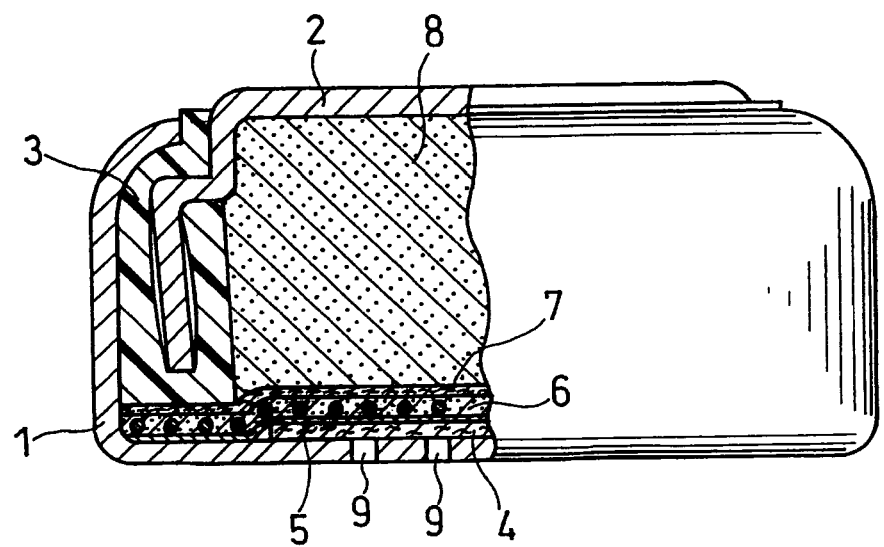
FIG. 11 is a longitudinal sectional view of a conventional rectangular air battery.

The batteries of Example 16 exhibited the lowest leakage rate after 5 weeks and the smallest amount of change in internal resistance after the HC test among all Examples. Also, each of the batteries of Example 16 was covered with epoxy resin and cut along the diagonal line of the batteries. FIG. 10 shows the longitudinal sectional view. At the parts corresponding to the corners of the batteries, the compression rate of a part T of the insulating gasket 103 sandwiched between a shoulder part 125S provided on the sidewall 122 of the second case 102 and the sidewall 212 of the first case 201 averaged 40% both on a left side $T_L$ and a right side $T_R$ of the longitudinal sectional view as shown in FIG. 10. It is noted that the compression rate of the part T of the insulating gasket=(the thickness of part T after compression)/(the thickness of part T before compression)×100.

Likewise, the batteries were cut at the center of the shorter sides and longer sides, and their longitudinal sections were observed. That is, the observed sections correspond to the A-A line section and the B-B line section of FIG. 8. In the same manner as the above, the compression rate of the insulating gasket by the shoulder part of the second case and the sidewall of the first case averaged 40% both on the left side and the right side of the longitudinal section cut at the center of the longer sides and the longitudinal section cut at the center of the shorter sides. This suggests that the compression rate of the insulating gasket by the shoulder part of the second case is uniform throughout the gasket. Accordingly, the stress exerted on the gasket in the direction perpendicular to the axis of the battery after the sealing can be distributed uniformly around the perimeter of the gasket, so that the resistance to electrolyte leakage can be improved.

The batteries of Example 17 were not observed to leak even after 5 weeks. Further, the amount of change in internal resistance after the HC test was smaller than that of Example 8. In the same manner as the batteries of Example 16, the batteries were covered with epoxy resin, cut along the diagonal lines of the batteries, and their longitudinal sections were observed. At the parts corresponding to the corners of the batteries, the compression rate of the insulating gasket by the shoulder part of the second case averaged 38% on the left and right sides of the longitudinal section. Likewise, the batteries were cut at the center of the longer sides and shorter sides, and their longitudinal sections were observed. The compression rate of the insulating gasket by the shoulder part of the second case averaged 38% on the left and right sides of the longitudinal section cut at the center of the longer sides, and this rate also averaged 38% on the left and right sides of the longitudinal section cut at the center of the shorter sides. This suggests that the compression rate of the insulating gasket by the shoulder part of the second case is uniform throughout the gasket. Accordingly, the stress exerted on the gasket in the direction perpendicular to the axis of the battery after the sealing can be distributed uniformly around the perimeter of the gasket, so that the resistance to electrolyte leakage can be improved.

In the foregoing Examples, descriptions have been made of the air batteries that are 25 mm in length, 35 mm in width, and 3.0 mm in thickness, but the size is not limited to this size.

In the foregoing Examples, descriptions have been made of the sealing structure with respect to the formation of a rib on a first case in a rectangular air battery, the ratio of the height of the rib to the width, and the ratio of the sidewall thickness of the second case to the sidewall thickness of the first case. Such sealing structure can be applicable to the sealing structure of other batteries than rectangular air batteries, such as rectangular alkaline manganese batteries and rectangular silver oxide batteries, by eliminating the air holes of the first case. The application of such sealing structure can produce rectangular batteries with an excellent resistance to electrolyte leakage.

The present invention can provide a high quality rectangular air battery by providing a rib on a first case. The rectangular air battery according to the present invention can be used not only in miniature hearing aids and small-sized pagers but also as the driving power source for small-sized electronic equipment, such as portable electronic devices and small-sized audio equipment.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A rectangular air battery comprising:
   a) a rectangular first case serving as a positive electrode terminal, said first case comprising: a bottom with air holes; four sidewalls that are continuous and connected to said bottom; and an upper opening that is defined by said sidewalls;
   b) a rectangular second case serving as a negative electrode terminal, said second case comprising: a bottom; four sidewalls that are continuous and connected to said bottom; and an upper opening that is defined by said sidewalls;
   c) an air diffusion paper, a water repellent film, an air electrode, and a separator, which are layered in this order on the bottom inside the first case;
   d) an insulating gasket with a substantially U-shaped cross-section, said insulating gasket comprising: four outer sidewalls; four inner sidewalls; and a bottom connecting said outer sidewalls with said inner sidewalls, said insulating gasket being fitted to said second case so as to sandwich the sidewalls of said second case between the outer sidewalls and the inner sidewalls; and
   e) a negative electrode which contains an electrolyte and is accommodated in the second case,
   said first case and said second case being joined such that the opening of the second case faces the bottom of the first case,
   said first case and said second case being sealed by crimping the opening edge of the sidewalls of the first case onto the outer face of the second case, with the outer sidewalls of said insulating gasket interposed therebetween,
   wherein a rib is provided on the bottom of the first case so as to protrude inward inside the first case, said rib extends along the sidewalls of said first case, and said rib supports the inner lower end of the inner sidewalls of said insulating gasket, with at least said separator interposed therebetween.

2. The rectangular air battery in accordance with claim 1, wherein said water repellent film, said air electrode and said separator are sandwiched between the rib of the first case and the bottom of the insulating gasket.

3. The rectangular air battery in accordance with claim 1, wherein the rib of said first case has a cross section in which the ratio b/a of the height b of the protruded part of the rib to the width thereof a is 0.1 to 2.5.

4. The rectangular air battery in accordance with claim 1, wherein the ratio d/c of the thickness d of the sidewalls of said second case to the thickness c of the sidewalls of said first case is 1.1 to 2.5.

5. The rectangular air battery in accordance with claim 1, wherein the corner formed by the bottom and each of the outer sidewalls of the insulating gasket is rounded, and the peripheral edge of the air electrode is sandwiched between the rounded corner and each of the sidewalls of the first case.

6. The rectangular air battery in accordance with claim 1, wherein the tip of the protruded part of the rib is rounded.

7. The rectangular air battery in accordance with claim 1, wherein the bottom of the first case comprises a first part inside the rib and a second part outside the rib, the first part protrudes downward from the second part so that there is a difference in level between the first part and the second part, and the difference in level is equal to or smaller than the thickness of the bottom of the first case.

8. The rectangular air battery in accordance with claim 1, wherein the sidewalls of the first case and the second case and the inner and outer sidewalls of the insulating gasket, corresponding to four sides of the rectangular air battery, are slightly rounded outward.

9. A rectangular air battery comprising:
   a) a rectangular first case serving as a positive electrode terminal, said first case comprising: a bottom with air holes; four sidewalls that are continuous and connected to said bottom; and an upper opening that is defined by said sidewalls;
   b) a rectangular second case serving as a negative electrode terminal, said second case comprising: a bottom; four sidewalls that are continuous and connected to said bottom; and an upper opening that is defined by said sidewalls;
   c) an air diffusion paper, a water repellent film, an air electrode, and a separator, which are layered in this order on the bottom inside the first case;
   d) an insulating gasket with a substantially U-shaped cross-section, said insulating gasket comprising: four outer sidewalls; four inner sidewalls; and a bottom connecting said outer sidewalls with said inner sidewalls, said insulating gasket being fitted to said second case so as to sandwich the sidewalls of said second case between the outer sidewalls and the inner sidewalls; and
   e) a negative electrode which contains an electrolyte and is accommodated in the second case,
   said first case and said second case being joined such that the opening of the second case faces the bottom of the first case,
   said first case and said second case being sealed by crimping the opening edge of the sidewalls of the first case onto the outer face of the second case, with the outer sidewalls of said insulating gasket interposed therebetween,
   wherein four ribs are provided on the bottom of the first case so as to protrude inward inside the first case, said four ribs extend in parallel with the sidewalls of said first case, with a break at parts corresponding to the corners of said first case, and said four ribs support the inner lower end of the inner sidewalls of the insulating gasket, with at least said separator interposed therebetween.

10. The rectangular air battery in accordance with claim 9, wherein said water repellent film, said air electrode and said separator are sandwiched between the rib of the first case and the bottom of the insulating gasket.

11. The rectangular air battery in accordance with claim 9, wherein the rib of said first case has a cross section in which the ratio b/a of the height b of the protruded part of the rib to the width thereof a is 0.1 to 2.5.

12. The rectangular air battery in accordance with claim 9, wherein the ratio d/c of the thickness d of the sidewalls of said second case to the thickness c of the sidewalls of said first case is 1.1 to 2.5.

13. The rectangular air battery in accordance with claim 9, wherein the corner formed by the bottom and each of the outer sidewalls of the insulating gasket is rounded, and the peripheral edge of the air electrode is sandwiched between the rounded corner and each of the sidewalls of the first case.

14. The rectangular air battery in accordance with claim 9, wherein the tip of the protruded part of the rib is rounded.

15. The rectangular air battery in accordance with claim 9, wherein the bottom of the first case comprises a first part inside the rib and a second part outside the rib, the first part protrudes downward from the second part so that there is a difference in level between the first part and the second part, and the difference in level is equal to or smaller than the thickness of the bottom of the first case.

16. The rectangular air battery in accordance with claim 9, wherein the sidewalls of the first case and the second case and the inner and outer sidewalls of the insulating gasket, corresponding to four sides of the rectangular air battery, are slightly rounded outward.

* * * * *